United States Patent [19]
Schmid

[11] Patent Number: 5,920,136
[45] Date of Patent: Jul. 6, 1999

[54] DRIVE DEVICE WITH BRAKE INCORPORATED FOR AN ELECTRICALLY OPERATED VEHICLE

[76] Inventor: Egon Schmid, Sauldorfer Strasse 1, D-88605 Sauldorf 3, Germany

[21] Appl. No.: 08/875,014
[22] PCT Filed: Jan. 19, 1996
[86] PCT No.: PCT/EP96/00217
§ 371 Date: Jul. 16, 1997
§ 102(e) Date: Jul. 16, 1997
[87] PCT Pub. No.: WO96/22895
PCT Pub. Date: Aug. 1, 1996

[30] Foreign Application Priority Data

Jan. 23, 1995 [DE] Germany .......................... 195 01 926
May 9, 1995 [DE] Germany .......................... 195 16 896

[51] Int. Cl.⁶ .............................. H02K 7/00; B60K 1/00; F16D 65/54
[52] U.S. Cl. ..................... 310/77; 310/75 C; 310/75 R; 310/93; 180/65.6; 180/65.5; 180/65.7; 188/171
[58] Field of Search .............................. 310/75 R, 75 C, 310/77, 93, 67 R, 112; 180/65.6, 65.5, 65.7; 188/171

[56] References Cited

U.S. PATENT DOCUMENTS

| | | | |
|---|---|---|---|
| 2,505,770 | 5/1950 | Hill | 310/67 R |
| 2,506,146 | 5/1950 | Gladish | 310/67 R |
| 3,703,654 | 11/1972 | Karubian | 310/77 |
| 4,071,121 | 1/1978 | Daniel | 188/196 |
| 4,938,321 | 7/1990 | Kelley et al. | 188/171 |
| 5,014,800 | 5/1991 | Kawamoto et al. | 180/65.5 |
| 5,246,082 | 9/1993 | Alber | 180/65.5 |
| 5,274,290 | 12/1993 | Fischer | 310/93 |
| 5,600,191 | 2/1997 | Yang | 310/67 R |

Primary Examiner—Thomas M. Dougherty
Assistant Examiner—Tran N Nguyen
Attorney, Agent, or Firm—Bachman & LaPointe, P.C.

[57] ABSTRACT

A drive device for an electrically operated vehicle, in particular a wheelchair, having at least one rim with rim well and an axle shaft wherein a brake is integrated into an annular channel formed between the rim and the axle shaft.

14 Claims, 2 Drawing Sheets

DRIVE DEVICE WITH BRAKE INCORPORATED FOR AN ELECTRICALLY OPERATED VEHICLE

BACKGROUND OF THE INVENTION

The invention relates to a drive device for an electrically operated vehicle, in particular for a wheelchair, having at least one rim with rim well and an axle shaft.

There are very many forms and designs of electrically operated vehicles. These include, for example, electric automobiles, vehicles in the internal area of train stations and industrial buildings, children's vehicles and in particular also wheelchairs. In most cases here the drive wheels are connected via an axle shaft to a transmission, for which reason the power consumption of such drives is significantly increased.

In recent time a change has been made to integrating the drive and in particular the motor into the wheel itself, so-called wheel-hub drives or drum motors being known here. These include electronically commutated wheel-hub motors. However, these wheel-hub motors are likewise connected to the drive shaft via a transmission, so that considerable energy is still lost.

The present invention is based on the object of providing a drive device of the above-mentioned type with which the vehicle can be operated in as low-power and low-noise a manner as possible and has the lowest possible constructional width. Furthermore, the braking function is to be significantly improved.

SUMMARY OF THE INVENTION

In order to achieve this object, an annular channel is formed between the rim and the axle shaft, and a motor and a brake are integrated in said annular channel.

The significant advantage of this drive device according to the invention resides in the fact that the constructional width of the overall drive is reduced to a minimum. The entire drive, and the braking system as well, is arranged inside the rim itself. A chassis of a vehicle or, for example, the chair of a wheelchair, is then connected to the static part of this drive device in any desired manner.

The motor and the brake are preferably separated from each other by an inner housing ring. This inner housing ring is a part of the static part and presents itself for the connection to the chair or the chassis of the vehicle. Furthermore, the stator part of the motor is likewise to be rotationally firmly connected to this inner housing ring. The rotor part, on the other hand, is arranged on the rim itself, around the stator part. Toward the stator part, the rotor part is equipped with corresponding magnetic strips, which form an air gap toward the stator part. In this way, the rotor part rotates around the stator part.

Permanent magnetic strips, which ensure a high power transfer, are preferably used.

As a result of the arrangement selected, it is possible to support the inner housing against the axle shaft via two bearings, these bearings being spaced relatively far apart from each other in one exemplary embodiment. This achieves a maximum bearing spacing for the corresponding wheel with, at the same time, the minimum constructional width of the overall drive. Furthermore, it is possible to use bearing designs which can readily be adjusted without play. Rolling bearings (shouldered radial-thrust bearings), which ensure the greatest possible quietness of running, are the most obvious.

A significant feature of the present invention is, however, directed to the braking system. For wheelchairs in particular it is necessary that if the electrical system fails, there must be a stopping brake which brakes the wheelchair as quickly as possible. According to the present invention, this stopping brake is likewise integrated in the annular channel of the rim, so that no additional space has to be occupied.

A brake space is formed by the inner housing ring together with a ring made of a ferritic material, at least one brake disk projecting into said brake space. Preferably, however, a plurality of brake disks is used. These brake disks are seated along an axis of the axle shaft itself, but they can be displaced axially with respect to the axle shaft. This is ensured by a splined connection between brake disk and axle shaft, the brake disk preferably being produced from a material used for brake linings.

The brake disk is in turn assigned brake rings which can be displaced along the axis of the axle shaft. These brake rings are preferably coupled to the inner housing ring via splined connections. If a plurality of brake disks and a plurality of brake rings are used, the brake rings are always between two brake disks. In order to brake the vehicle, the outermost brake ring is assigned a force store which presses the outermost brake ring against its adjacent brake disk. If the arrangement has a plurality of brake rings and brake disks, this pressure is forwarded from brake disk to brake ring and vice versa. This results in effective braking of the vehicle.

By contrast, in order to cancel the braking effect, an axially acting magnetic coil is assigned to the outermost brake ring. This magnetic coil acts counter to the force of the force store and attracts the outermost brake ring, so that the brake disks can run freely between the brake rings. In this arrangement, the magnetic coil is located in an annular space in the above-mentioned ferritic ring. If the power fails, then the magnetic coil releases the outermost brake ring, and immediate braking takes place. If the brake is then to be released once more, this takes place via the magnetic coil or, if the electrical system is still out, via a device by means of which the outermost brake ring is moved axially, for example by hand, counter to the force of the force store. This device may comprise any desired levers, eccentric levers or lever arrangements.

In the one exemplary embodiment, the brake disks and also the brake rings are otherwise located between the two above-mentioned bearings, so that a very good force ratio during braking is ensured. Twisting as a result of the braking action cannot occur.

In another exemplary embodiment, however, the brake disks and the brake rings are arranged outside the two bearings, these two bearings being supported on the one hand against the axle shaft and on the other hand against an axle sleeve which is integrally molded on the inner housing ring. It is thus possible, as required, to set up the overall drive device with a very low overall length or else with a relatively large overall length, which in turn has other advantages.

What is to be emphasized primarily is that when releasing the brake or else when initiating the braking operation, hardly any noise is produced. It is possible to hear only a slight click when the magnetic coil attracts the outermost brake ring. This constitutes a major advantage by comparison with the previously known braking devices.

BRIEF DESCRIPTION OF THE DRAWINGS

Further advantages, features and details of the invention emerge from the following description of a preferred exemplary embodiment, and with reference to the drawing, in which.

DETAILED DESCRIPTION

Figure 1:
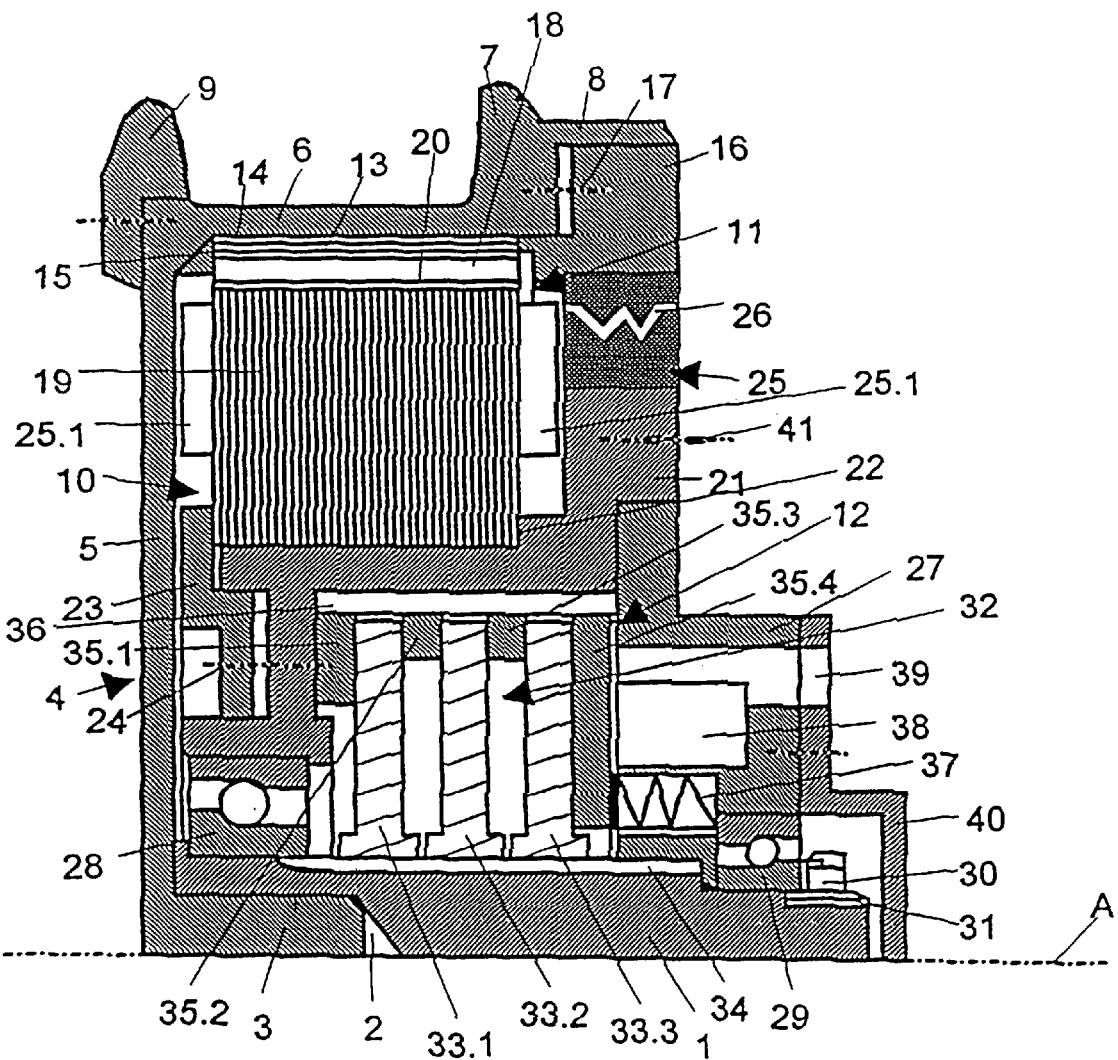
FIG. 1 shows a partial cross section through a drive device according to the invention for an electrically operated vehicle.

The present case concerns a so-called wheel-hub drive or drum motor without transmission. Formed in an axle shaft 1 at the end is a blind hole 2, into which a journal 3 of a rim 4 engages. The journal 3 is rotationally firmly fixed in the blind hole 2 of the axle shaft 1, for example being shrunk in, bonded or the like.

The journal 3 projects approximately centrally out of a rim disk 5 which is bounded at the edge by a rim well 6. The rim well 6 merges in one piece into an inner rim flange 7, which is adjoined by a housing ring 8. From the outside at the transition from rim disk 5 to rim well 6, a rim flange ring 9 is placed in a removable manner on the rim 4, appropriate fastening elements being indicated with dash-dotted lines. The removability of the rim flange ring 9 ensures that, for example, even a wheelchair user can easily remove a tire which is located in the rim well 6 but not shown in more detail, and replace it with a new one.

Overall, the rim 4 together with the axle shaft 1 forms an annular channel 10 for the accommodation of a motor 11 and of a stopping brake 12. In this case, the motor 11 is designed as an electric motor. Its rotor part 13 is rotationally firmly connected to the rim 4, the corresponding rotor part 13, as a laminate stack, resting snugly in the manner of a circular ring against an inner face 14 of the rim well 6 and being supported on one side against a shoulder 15 which is molded into the inner face 14.

From the other side, a pressure ring 6 presses on the rotor part 13 and presses the latter against the shoulder 15, with the result that the rotor part 13 is clamped between the shoulder 15 and the pressure ring 16. The fixing or the clamping is carried out via fastening elements 17 which are indicated with dash-dotted lines.

Magnetic strips 18, in particular permanent magnet strips, are placed on the rotor part 13, parallel to a main axis A of the drive. The individual magnetic strips 18 are arranged spaced apart from one another along the rotor part 13.

Between the magnetic strips 18 and a stator part 19, which is likewise designed as a laminate stack, there is an air gap 20. The stator part 19 is, as its name suggests, fixed and is pushed on an inner housing ring 21 and rotationally firmly connected to the latter. To this end, this inner housing ring 21 likewise forms a shoulder 22, against which the stator part 19 stops. The stator part 19 is braced by a stepped washer 23 which, at the other end of the shoulder 22, presses on the stator part and is connected to the inner housing ring 21 via fastening elements 24 indicated by dash-dotted lines. Clearances 25.1 to accommodate the respective winding overhangs of the stator part 19 are indicated on either side of the stator part 19.

Since the pressure ring 16 can rotate together with the rim 4, but the inner housing ring 21 is designed to be fixed, there is located between the two of them a seal 25 which is preferably composed of two plastic parts. In this case, one plastic part is likewise rotatable with respect to the other plastic part, but between the two plastic parts there is a labyrinth seal 26.

In order that the rim 4 can rotate with respect to the inner housing ring 21, a bearing 28 and 29 is in each case provided between the inner housing ring 21 and the axle shaft 1, and between a ferritic ring 27, which is connected to the inner housing ring 21, and the axle shaft 1. A rolling bearing (shouldered radial-thrust bearing) is most suitably used here. The two bearings 28 and 29 are braced by appropriate lateral stops, the overall fixing being performed via a nut 30 which is placed onto an external thread 31 of the axle shaft 1.

Together with the axle shaft 1 and the ferritic ring 27, the inner housing ring 21 forms a brake space 32, into which three brake disks 33.1, 33.2 and 33.3 project from the axle shaft 1. These brake disks 33 can rotate freely in the brake space 32. They consist of an appropriate brake-lining material and are rotationally firmly fitted to the axle shaft 1. To this end, the axle shaft 1 has appropriate female splines 34 running parallel to the axis A, into which male splines of the brake disks 33 (not shown in more detail) engage. In this way, the brake disks 33 are pushed on the axle shaft 1 and can be moved along the axis A. Their movement is however limited by brake rings 35.1, 35.2, 35.3 and 35.4. These brake rings 35 have female splines, likewise not shown in more detail, into which male splines 36 engage, said splines projecting in turn into the brake space 32 from the inner housing ring 21. In this arrangement, the outer brake ring 35.1 can in addition be connected to the inner housing ring 21 via the fastening element 24. The other brake rings 35.2, 35.3 and 35.4 are, however, intended to be arranged such that they can be displaced along the axis A.

The desired braking action between the brake disks 33 and the brake rings 35 is produced via a force store 37 which, in the present exemplary embodiment, is an appropriately dimensioned spring or springs. This force store 37 presses on the outermost brake ring 35.4, via which the following brake disks 33 and brake rings 35 are then pushed together. As a result of the arrangement of a plurality of brake disks 33 and brake rings 35 one behind another, the diameter of the overall stopping brake 12 can be kept extremely small. The number of brake disks 33 and brake rings 35 can be selected arbitrarily, depending on the braking torque or holding moment required.

A further major advantage of the arrangement of a plurality of brake disks and brake rings resides in the fact that the force of the force store 37 can be kept relatively small, as a result of which the development of noise during the actuation of the brake is also very small. The electrical losses are also extremely low as a result.

In order to open the stopping brake 12, an annular space, in which there is a magnetic coil 38, is indicated in the ferritic ring 27. As long as the overall drive is supplied with power, the magnetic coil attracts the outermost brake ring 35.4 counter to the force of the force store 37, so that there is no force connection between the brake disks 33 and the brake rings 35. The brake is released.

However, if the power fails, then the magnetic coil in the annular space 38 is also not supplied with power, so that the outermost brake ring 35.4 is released and the brake rings and brake disks close under the pressure of the force store 37. In order that the outermost brake ring 35 can interact with the magnetic coil, the outermost brake ring 35.4 is likewise composed of a ferritic material, for example of steel. The remaining parts of the drive, with the possible exception of the axle shaft 1, may be composed of aluminum.

Precautions must be taken, however, that the stopping brake 12 can also be released when there is no power flow to the magnetic coil in the annular space 38. To this end, only one opening 39 through a cover 40 and the ferritic ring 27 is indicated, through which a corresponding lever or any desired pulling element engages, with which the outermost brake ring 35.4 can be guided by hand counter to the force store 37. However, the configuration of this lever is of subordinate importance.

The entire drive is fixed to an electric vehicle which is not shown in more detail. To this end, a possible fastening 41 between the inner housing ring 21 and the vehicle is merely indicated.

Figure 2:
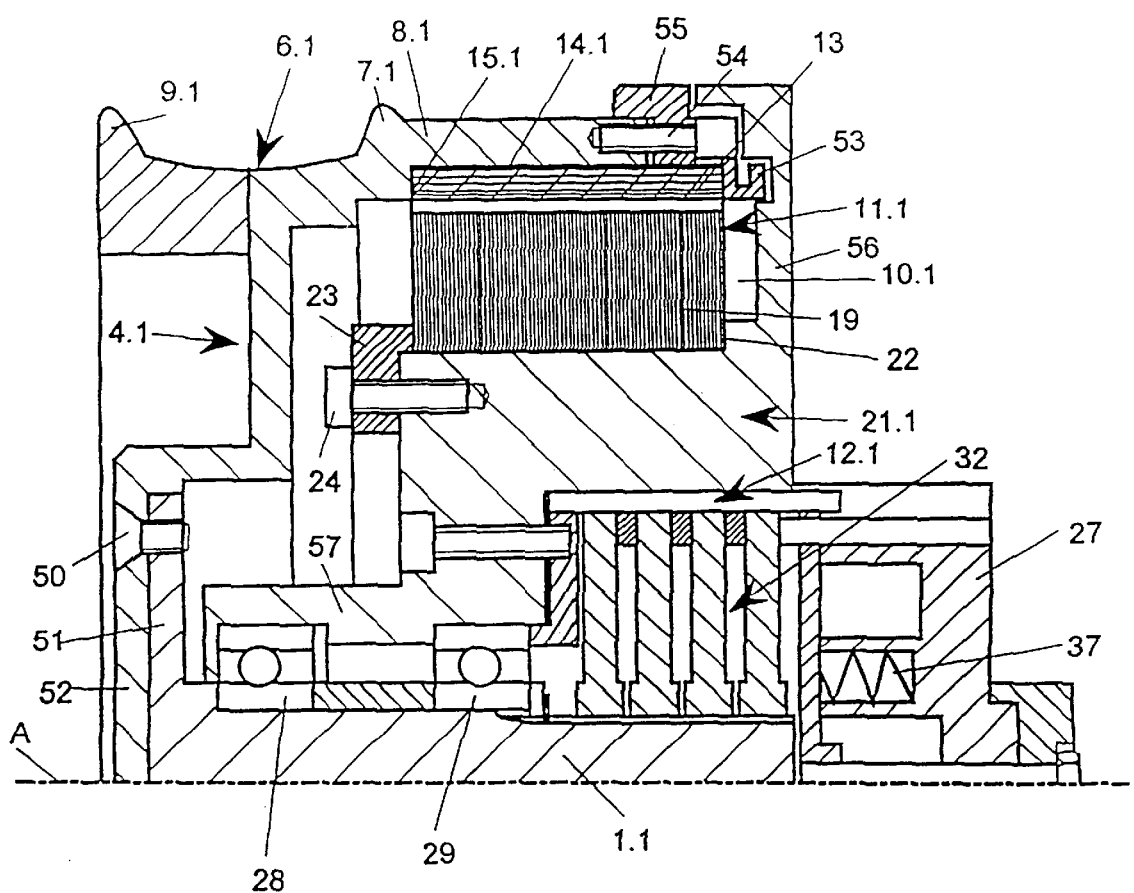
FIG. 2 shows a partial cross section through a further exemplary embodiment of a drive device according to the invention for an electrically operated vehicle.

According to the exemplary embodiment in accordance with FIG. 2, an axle shaft 1.1 is connected to a rim 4.1 by means of countersunk screws 50. In this case a disk-shaped ring 51 of the axle shaft 1.1 rests on a corresponding inner rim well 52. The other rim well 6.1 likewise merges in one piece into an inner rim flange 7.1, which is adjoined by a housing ring 8.1. It is also possible to see here a rim flange ring 9.1 which, however, also forms approximately one half of the rim well 6.1. By this means, the removal of a tire by a wheelchair user is once again facilitated.

In the present exemplary embodiment, the housing ring 8.1 is designed to be significantly lengthened with respect to that according to the exemplary embodiment of FIG. 1, so that an annular channel 10.1 for the accommodation of a motor 11.1 and of a stopping brake 12.1 is not arranged underneath the rim well 6.1 but underneath or inside the housing ring 8.1. A corresponding rotor part 13 of the motor 11.1 rests on an inner face 14.1 of the housing ring 8.1 and is pressed against a shoulder 15.1 by an outer ring 53, by means of fastening elements 54 which moreover pass through a slip ring 55.

An inner disk 56 engages over the entire motor region 11.1 in a sealing manner, said inner disk 56 merging into the inner housing ring 21.1. The stator part 19.1 is pushed onto this inner housing ring 21.1 and fixed between a stepped washer 23 and a shoulder 22.

Opposite the inner disk 56, an axle sleeve 57 projects from the inner housing ring 21.1, the axle sleeve 57 partially surrounding the axle shaft 1.1 and being supported against this axle shaft 1 via the two bearings 28 and 29.

Whereas according to the exemplary embodiment in accordance with FIG. 1 the stopping brake 12 is arranged within the two bearings 28 and 29, the stopping brake 12.1 according to the exemplary embodiment in accordance with FIG. 2 is located outside the bearing 29. Otherwise, the stopping brake 12.1 is of identical design, for which reason further description will be dispensed with.

I claim:

1. A drive device for an electrically operated vehicle comprises an axle shaft disposed along an axis A; at least one rim connected to the axle shaft for rotation therewith, said at least one rim having a rim well wherein said rim well and said axle shaft define therebetween an annular channel; an inner housing ring positioned in said annular channel disposed along an axis B which is substantially parallel to axis A and axially dividing said annular channel into a motor space and a brake space, said inner housing ring being supported on the axle shaft by a pair of bearings; and a brake located in said brake space proximate to said pair of bearings wherein the inner housing ring is provided with a shoulder, a stepped washer is provided between a portion of the inner housing ring and the at least one rim, said stepped washer and said shoulder define with the inner housing ring a recess for receiving a motor.

2. A device according to claim 1 wherein the bearings are spaced apart and the brake is located at least in part between said pair of bearings.

3. A device according to claim 1 wherein said motor includes a rotor part and a stator part and the stator part of the motor is located in said recess.

4. A device according to claim 3 wherein the rotor part is clamped between a shoulder formed on an inner face of the rim wall and a pressure ring.

5. A device according to claim 4 wherein a seal is arranged between the pressure ring and the inner housing ring.

6. A device according to claim 1 wherein the brake includes a plurality of brake discs projecting into the brake space between a plurality of brake rings.

7. A device according to claim 6 wherein each of the plurality of brake discs is seated on the axle shaft and is displaceable along the axis A of the axle shaft.

8. A device according to claim 7 wherein each of said plurality of brake discs is mounted on the axle shaft by means of a splined connection.

9. A device according to claim 6 wherein each of said plurality of brake rings is mounted on the inner housing ring by means of a splined connection.

10. A device according to claim 8 wherein each of said plurality of brake rings is mounted on the inner housing ring by means of a splined connection.

11. A device according to claim 9 wherein the brake rings include an outer brake ring and a spring acts on the outer brake ring for moving the brake rings along the axis A of the axle shaft.

12. A device according to claim 11 wherein the outer brake ring is actuated by a magnetic coil.

13. A device according to claim 12 wherein the magnetic coil is located in an annular space defined by a ferrite ring between the inner housing ring and the axle shaft.

14. A device according to claim 11 wherein the outer brake ring is connected to a device for manually actuating the brake.

* * * * *